M. JACKSON.
CONDUIT FOR TIMER WIRES.
APPLICATION FILED JUNE 16, 1920.

1,396,758.

Patented Nov. 15, 1921.

Witness

Inventor
Monroe Jackson.
By C. A. Snow & Co.
Attorneys

UNITED STATES PATENT OFFICE.

MONROE JACKSON, OF LINCOLN, ARKANSAS.

CONDUIT FOR TIMER-WIRES.

1,396,758.  Specification of Letters Patent.  Patented Nov. 15, 1921.

Application filed June 16, 1920. Serial No. 389,410.

*To all whom it may concern:*

Be it known that I, MONROE JACKSON, a citizen of the United States, residing at Lincoln, in the county of Washington and State of Arkansas, have invented new and useful Conduits for Timer-Wires, of which the following is a specification.

This invention relates to a conduit especially designed for use in connection with "Ford" automobiles for the purpose of housing the wires of the timer mechanism so as to keep them out of the grease and dirt usually found in the pan under the engine.

Another object is to provide a conduit of this character which can be easily placed in position and secured without requiring the use of separate attaching means.

A further object is to provide a conduit which can be placed in position without requiring the services of a skilled mechanic.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1:
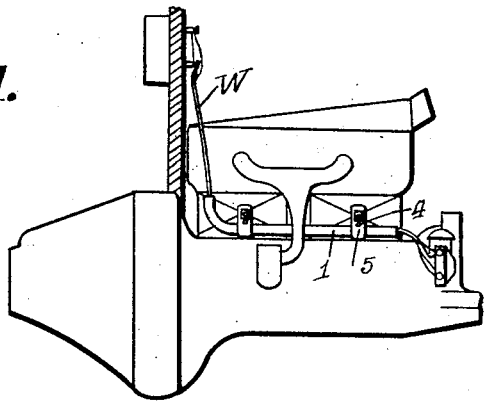
Figure 1 is a side elevation of an engine having the present improvements combined therewith.
Figure 2:
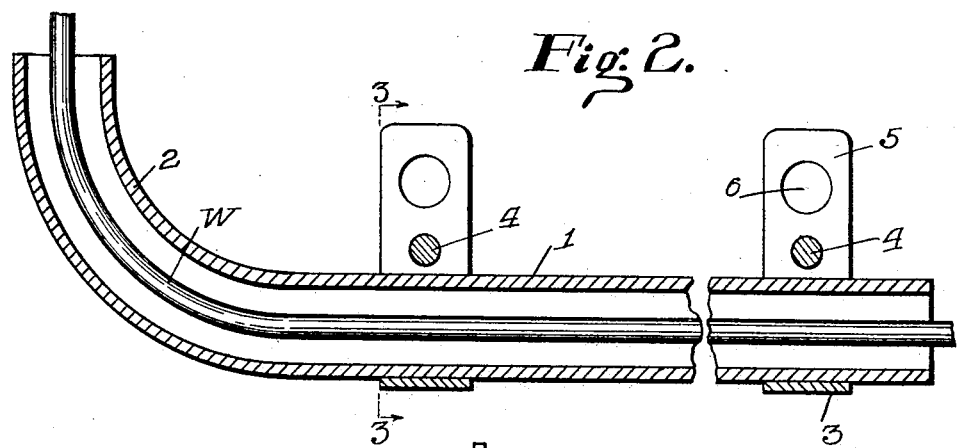
Fig. 2 is a longitudinal section through the conduit.
Figure 3:
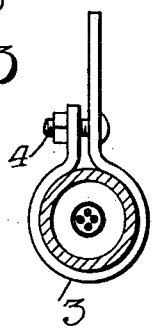
Fig. 3 is a section on line 3—3, Fig. 2.

Referring to the figures by characters of reference 1 designates a tube of any desired proportions and one end portion is curved to an arc of approximately 90°, as shown at 2. A split collar 3 is mounted on the tube near one end thereof and another similar split collar is mounted on the tube adjacent the curved portion, each of these collars being clamped upon the tube by bolts 4 engaging opposed portions of the clamp. One end of each clamp is extended to form a wing 5 and formed in each wing is an opening 6.

The tongues or wings 5 are so positioned that, by removing the nuts from the stud bolts usually found on the valve plate of the engine said wings can be placed on the bolts with the bolts projecting through the openings 6 after which the nuts can be replaced on the stud bolts and the conduit thus securely fastened to the engine. The wires of the timing engine have been indicated at W and are extended through the conduit as shown. The wings 5 will support the conduit under the carbureter manifold with the front end of the conduit extending out flush with the engine block so that the wires can extend downwardly from said end to the timer as shown in Fig. 1.

What is claimed is:

The combination with the engine of a motor vehicle, and a valve plate having stud bolts extending therefrom, of means for supporting the wires of the timer of the engine out of the contents of the pan under the engine, said means comprising a tube having a curved end, split collars, means engaging opposed portions of the collars for binding them upon the tube, and a wing extending from each collar and having an aperture for the reception of one of the stud bolts.

In testimony that I claim the foregoing as my own, I have hereto affixed my signature in the presence of two witnesses.

MONROE JACKSON.

Witnesses:
 JOHN E. MCCLURE,
 FRED JACKSON.